Figure 1:
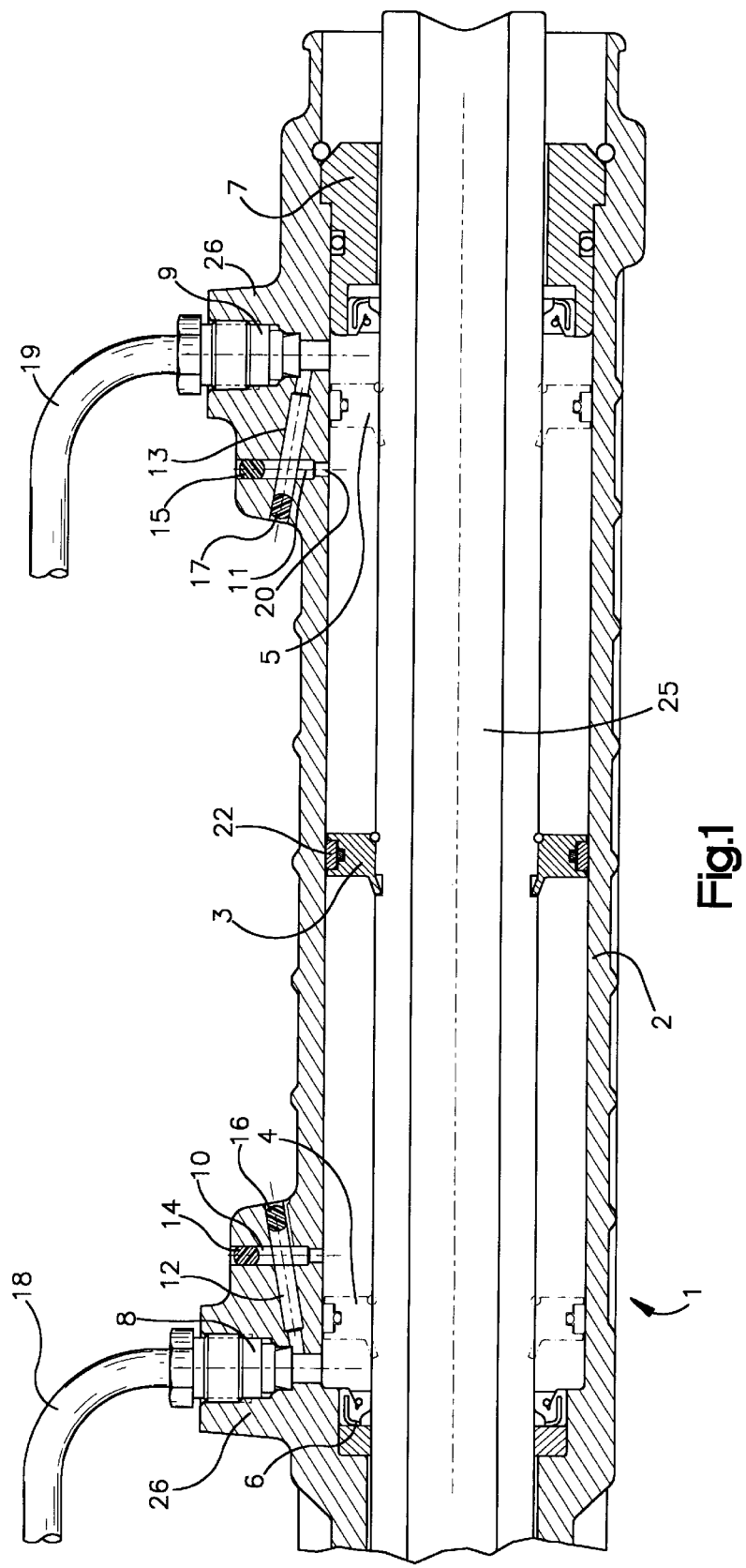

United States Patent
Eberhart

[19]

[11] Patent Number: 5,868,216
[45] Date of Patent: Feb. 9, 1999

[54] HYDRAULIC RACK-AND-PINION STEERING ASSEMBLY

[75] Inventor: Eugen Eberhart, Düsseldorf, Germany

[73] Assignee: TRW Fahrwerksystems GmbH & Co. KG, Dusseldorf, Germany

[21] Appl. No.: 631,531

[22] Filed: Apr. 12, 1996

[30] Foreign Application Priority Data

Apr. 15, 1995 [DE] Germany ............... 195 14 244.6

[51] Int. Cl.$^6$ .............................. B62D 5/06; F15B 15/20
[52] U.S. Cl. .................. 180/428; 91/392; 91/399; 91/437
[58] Field of Search ................. 180/428; 91/392, 91/399, 400, 437

[56] References Cited

U.S. PATENT DOCUMENTS 4,828,068  5/1989  Wendler et al. .

FOREIGN PATENT DOCUMENTS

| 1755048 | of 0000 | Germany . |
| 1967046 | of 0000 | Germany . |
| 3721826 | of 0000 | Germany . |
| 3929572 | of 0000 | Germany . |
| 4221459 | of 0000 | Germany . |
|  766784 | of 0000 | United Kingdom . |
| 1444631 | 8/1976 | United Kingdom . |

*Primary Examiner*—Karen M. Young
*Assistant Examiner*—R. R. Johnson
*Attorney, Agent, or Firm*—Tarolli, Sundheim, Covell, Tummino & Szabo

[57] ABSTRACT

For a hydraulic rack-and-pinion steering assembly for which a working piston is guided in a hydraulic cylinder which features an end limit stop by which, in an end position of the working piston, a path for the pressure agent supplied to the working piston by drill holes for the pressure agent is formed from the working space under pressure to a space of less pressure, in order to improve the hydraulic rack-and-pinion steering assembly such that it is simple to manufacture at limited cost, a rack-and-pinion steering assembly is improved by having, in the region of each pressure supply drill hole, at least one drill hole which can be executed and sealed from the housing exterior and which can be connected by means of a connecting line to the respective pressure supply.

5 Claims, 3 Drawing Sheets

HYDRAULIC RACK-AND-PINION STEERING ASSEMBLY

The invention pertains to a hydraulic rack-and-pinion steering assembly, for which a working piston is guided in a hydraulic cylinder which shows an end limit stop by means of which, in an end position of the working piston, a path for the pressure agent supplied to the working piston by means of drill holes for the pressure agent is formed from the working space under pressure to a space of less pressure.

Rack-and-pinion steering assemblies of the type described are known from the state of the art.

For a conventional hydraulic rack-and-pinion steering assembly without an end limit stop, the working piston is moved in one direction by means of the application of pressure, until a mechanical limit stop is reached at some place, e.g., a limit stop formed in the region of a steering tie rod axial joint and the steering box. The steering assembly as a whole must therefore be designed for higher stress, resulting in a great weight and corresponding production cost. In addition, the hard end limit stop results in noise and also puts the hydraulic pump under a high stress.

A variety of measures are known from the state of the art, which can be summarized under the generic term of force-equalizing aids. Such arrangements are known from U.S. Pat. No. 4,828,068, for which a bypass line connects the two working spaces of a hydraulic cylinder. Also belonging in this group is DE 3,721,826 C1, in which a power-assisted steering valve as well as the working spaces of a hydraulic cylinder are connected to a choke-regulating arrangement. Finally, DE 3,929,572 A1 belongs in this group, for which the two working spaces are likewise connected by means of a longitudinal drill hole, both ends of which feature return valves controlled in opposite directions. All of the aforementioned arrangements serve to decrease steering support, in particular, in the end limit stop position.

However, the aforementioned arrangements cannot eliminate the problem described with respect to the end limit stop.

A hydraulic rack-and-pinion steering assembly of this generic class is known from GB PS 766,784, for which when the working piston is in the region of the end limit stop, it runs into recessed channeled regions arranged in the inner wall of the hydraulic cylinder, such that the hydraulic seal between piston and cylinder wall is compensated. It is known from DE 1,967,046 to arrange the pressure supply regions, on one hand, at the ends of the cylinder and, on the other hand, also parallel, near the center. When the piston runs over the respective center supply region, pressure controls can engage and thus limit the piston at an end limit stop. A hydraulic rack-and-pinion steering assembly of this generic class is known from DE 4,221,459 A1 for which either the already known channel-like recesses are likewise executed, or else blind drill holes or connecting drill holes executed in the housing interior are executed in order to execute two pressure agent conveyances, parallel to each other, from each individual pressure agent supply.

All of the arrangements cited necessitate costly housing configurations and, in particular, also necessitate costly machining in the interior of the hydraulic cylinder. The channel-like recesses must be carefully formed on the inner wall of the cylinder. The anticipated drill holes must be executed from the inside at great expense. The connecting lines known from DE 1,967,046 are located on the exterior and, as bypass lines, represent additional components.

Generally, the anticipated hydraulic rack-and-pinion steering assemblies are costly in terms of manufacture and material requirements. In addition, sealing and guiding problems at the inner wall of the cylinder cannot be taken into consideration. If, for example, drill holes are executed from the point of the inner wall, then these drill holes may have sharp edges, such that the piston seals may be worn away more quickly than is common, or even damaged, making for an unsatisfactory service life of a conventional rack-and-pinion steering assembly.

Starting from this state of the art, the underlying purpose of the present invention is to improve a rack-and-pinion steering assembly of this generic class to the extent that it is simple to manufacture at a limited cost.

In order to technically solve this problem, a rack-and-pinion steering assembly of this generic class is further developed by means of, in the region of each pressure supply drill hole, at least one drill hole which can be executed and sealed from the housing exterior and which can be connected by means of a connecting line to the respective pressure supply.

The improvement according to the invention creates the possibility of providing a housing of simple construction with a corresponding end limit stop by means of drill holes provided from the exterior. The drill holes are then closed from the housing exterior and can form corresponding connecting systems located in the interior.

According to one proposal of the invention, the rack-and-pinion steering assembly according to the invention comprises one respective drill hole, in essence parallel to the respective pressure supply drill hole and offset in the direction of the other respective pressure supply. These two to each other [sic]* drill holes above the cylinder of the rack-and-pinion steering assembly, hence, a total of four drill holes, lie, in essence, parallel to each other. The two respective outer drill holes, i.e., lying at the end of the cylinder, serve to connect the pressure supply lines. The two inner drill holes can be connected to the pressure supplies by means of corresponding connecting lines. When the piston runs over the respective inner drill hole, the two pressure supplies are consequently connected to each other; this effects a hydraulic end limit stop. It is advantageous for the distance between the inner drill holes and the respective pressure supply drill holes to be greater than the working piston is wide. The end limit stop then lies in front of the respective pressure supply drill hole, which simplifies movement of the piston in the opposite direction.

*[Translator's note: This word appears to have been left in place erroneously when the sentence was revised in the original.]

According to another advantage of the invention, the connecting line is formed to run, in essence, in the direction of piston movement. Likewise, it is advantageous for this connecting line to be a drill hole executed from the housing exterior.

It is proposed as particularly advantageous for the drill holes to taper toward the interior of the cylinder. This step causes the seals on the piston side to move only along edges which are very small, so that wear to the seal is kept to a minimum.

According to an additional advantageous proposal of the invention, the housing features a dome-like enlargement in the region of the pressure supply. This dome-like enlargement serves for the formation of the desired drill holes and can be manufactured with simple means. After a vertical drill hole has been formed, this dome-like enlargement also can be added afterward and can feature a horizontal [supply] line. The exterior sealing region can be formed with conventional means, welding, gluing or the like. These steps make manufacture of the required lines particularly simple.

According to an additional advantageous proposal of the invention, a return valve is arranged in at least one of the drill holes. The arrangement of a return valve allows the different directions of movement of the piston to be realized easily by hydraulic means.

The invention proposes a rack-and-pinion steering assembly which can be manufactured with simple means, is economically simple to manufacture and which has a hydraulic end limit stop, without being subject to the known disadvantages of the state of the art.

Figure 2:
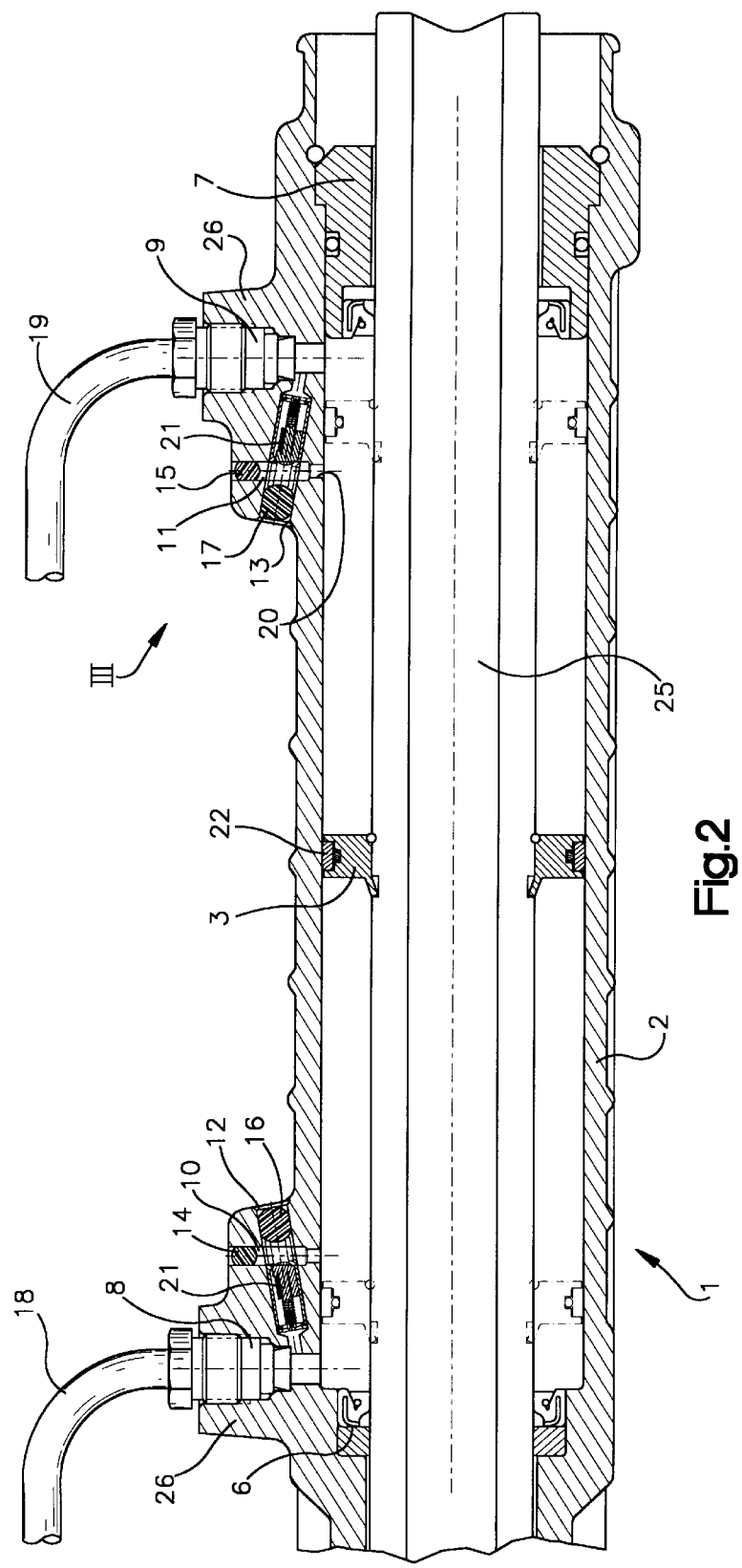
Figure 3:
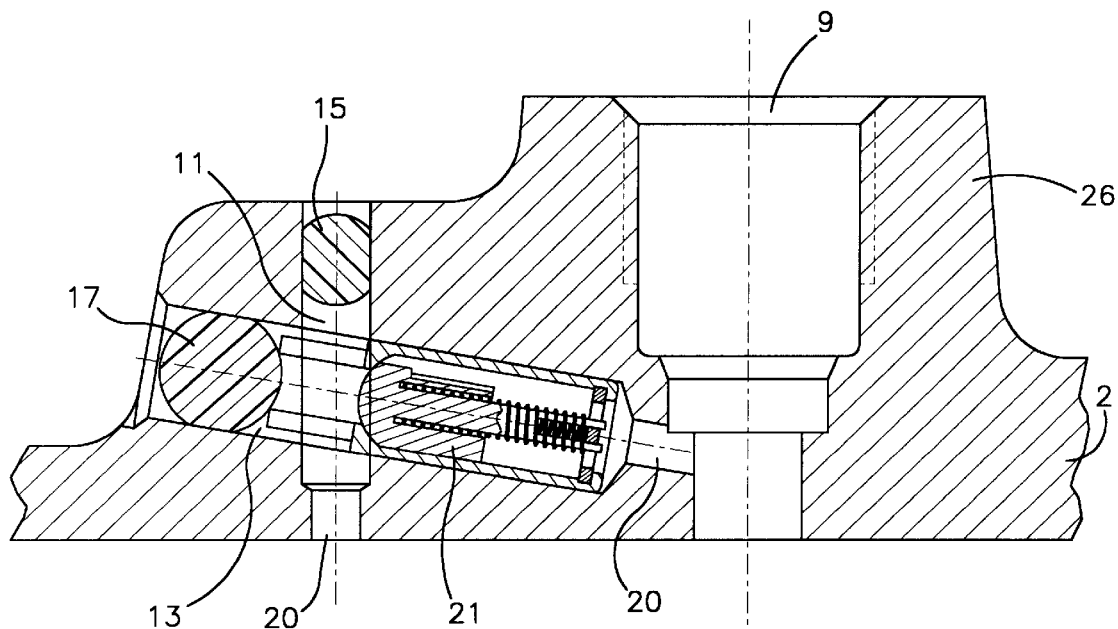

Additional advantages and features of the invention are revealed from the following description with the aid of the figures. Shown are:

FIG. 1: A representation, partially in section, of the cylinder region of a rack-and-pinion steering assembly according to a first embodiment;

FIG. 2: A representation, according to FIG. 1, of an additional embodiment;

FIG. 3: A representation of Detail III in FIG. 2 and

Figure 4:
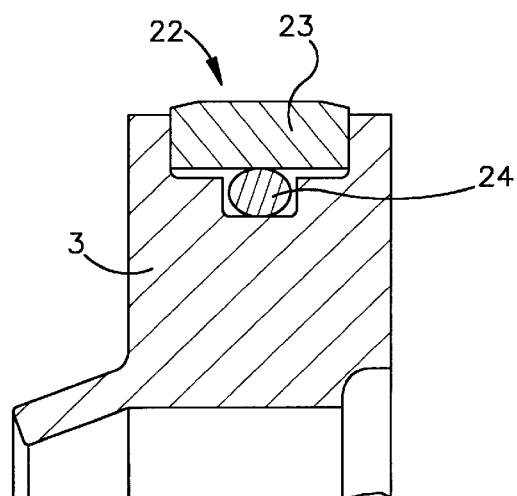

FIG. 4: A detailed representation of a piston.

For the rack-and-pinion steering assemblies (1) shown in FIGS. 1 and 2, the respective region of the cylinder (2) is shown in which a piston (3) arranged on a rack-and-pinion shaft (25), is movable back and forth. The piston positions (4,5) in the respective regions of end limit stops are shown in FIG. 1.

Both ends of the cylinder are closed by means of a seal (6,7). One section of the rack-and-pinion shaft (25) is formed as a toothed rack, in a manner not shown, and is connected to the pinion of a power-assisted steering valve. Both exterior ends of the rack-and-pinion shaft are connected, in a manner not shown, to the steering joints, not shown, of a steering system.

A pressure supply (8,9), which is formed in a housing, is formed at both ends of the cylinder (2), and is accommodated, in the embodiments shown, in a dome-like enlargement (26). The pressure lines (18,19) are inserted in the threaded drill holes (8,9) with conventional threaded ends. Pressure can now be applied to both sides of the piston. Adjacent to each pressure supply (8,9), a parallel drill hole (10,11), each offset to the center of the cylinder, is formed and is connected to the pressure supply (8,9) by means of a connecting drill hole (12,13). If pressure is applied to the piston (3) by means of the pressure line (19) and the pressure supply (9), which lead respectively to the right chamber of the cylinder, then the piston creeps to the left as seen in the perspective plane. If it runs over the parallel drill hole (10), the pressure supply (8) and, with this, the pressure line (18) for relief is connected, by means of the parallel drill hole (10) and the connecting drill hole (12), to the right chamber of the cylinder. This consequently results in a partial equalization of pressure and the piston travels with a reduced pressure to the end limit stop position. By reversing the control of pressure, pressure can be applied to the left side of the piston and it can be moved to the right end limit stop position shown in FIG. 1.

The lower regions of the parallel drill holes and connecting drill holes (10,11,12,13) are represented as having a taper, i.e., they are executed as so-called aperture drill holes (20).

FIG. 2 shows, in addition to the embodiment shown in FIG. 1, one return valve (21) respectively inserted in the connecting drill hole (12) and the connecting drill hole (13). FIG. 3 shows this detail with the aid of the right pressure supply drill hole (9). The return valve opens when the piston, for a movement to the right limit stop position shown in FIG. 1, runs over the parallel drill hole (11). Pressure supplied by means of the pressure line (18) is then returned to the pressure line (19) by means of the pressure supply (9). If pressure is applied to the right side of the piston, i.e., by means of the pressure line (19) and the pressure supply (9), then the return valve (21) closes, and a starting of the piston is fully supported by hydraulic means as for a steering gear without a mechanism for an end limit stop.

The drill holes executed as aperture drill holes (20) which, incidentally, are all closed with conventionally known closures, are passed over at the inner wall of the cylinder, by means of the exterior piston seals. FIG. 4 represents one embodiment. The piston (3), which is configured such that it can be easily be mounted on a rack-and-pinion shaft (25) by locking its right edge, in which a channeled recess is formed, onto a ring pushed on the rack-and-pinion shaft (25) and by means of the engagement of its left end, projecting like a lug, in a channel formed in the rack-and-pinion shaft (25), features a channel for accommodating a piston seal (22) at its exterior end. In the embodiment shown, the latter is formed from an exterior sealing ring (23) and an interior sealing ring (24), with the interior sealing ring bringing radial spring force to bear, in order to bring the exterior sealing ring (23) to a limit stop on the inner wall of the cylinder (2). In this regard, a wide execution of the sealing ring is particularly essential, as this prevents the seals from being damaged by passing over the aperture drill holes.

The enlargement (26) and the housing are formed as a single piece in the embodiment shown and the former rises around the pressure supplies (8,9) in a dome-like or cupola-like manner. This enlargement can also be formed by means of shells additionally attached and connected to the housing in a sealing manner and featuring threaded drill holes, longitudinal and transverse drill holes and the like. In this case, drill holes can also be formed by means of milled grooves in the enlargement shell.

List of reference numbers:
(1) Rack-and-pinion steering assembly
(2) Cylinder
(3) Piston
(4) Piston position
(5) Piston position
(6) Seal
(7) Seal
(8) Pressure supply
(9) Pressure supply
(10) Parallel drill hole
(11) Parallel drill hole
(12) Connecting drill hole
(13) Connecting drill hole
(14) Closure
(15) Closure
(16) Closure
(17) Closure
(18) Pressure line
(19) Pressure line
(20) Aperture drill hole
(21) Return valve
(22) Piston seal
(23) Exterior ring
(24) Interior ring
(25) Rack-and-pinion shaft
(26) Enlargement It is claimed:

1. A rack and pinion steering assembly comprising:
an elongated cylinder defining a fluid chamber, said cylinder having opposite first and second axial ends,
said cylinder including a first housing formed on said cylinder at said first axial end and a second housing formed on said cylinder at said second axial end, said first and second housings having respective interior and exterior areas;

a rack extending through said fluid chamber and through said first and second axial ends of said cylinder;

a movable piston connected to said rack and disposed in said fluid chamber, said piston being movable between said first and second axial ends of said cylinder and dividing said fluid chamber into first and second chamber portions, said first chamber portion adjoining said first axial end of said cylinder and said second chamber portion adjoining said second axial end of said cylinder;

a first fluid passage in said first housing extending from said exterior area of said first housing into said first chamber portion, means for fluidly connecting said first fluid passage to a fluid pressure supply to provide fluid to said first chamber portion;

a second fluid passage in said first housing extending from said exterior area of said first housing into said first chamber portion, said second fluid passage being spaced axially from said first fluid passage toward said second axial end of said cylinder;

a third fluid passage in said first housing extending from said exterior area of said first housing and intersecting with said first and second fluid passages in said first housing to provide fluid communication between said first and second fluid passages;

a return valve disposed in said third fluid passage, said return valve permitting fluid pressure flow through said third fluid passage when said piston is located at said first axial end of said cylinder and preventing fluid pressure flow when said piston is at a predetermined distance from said first axial end;

at least a fourth fluid passage in said second housing extending from said exterior area of said second housing into said second chamber portion to provide fluid communication to the second chamber portion;

a first closure member insertable from said exterior area of said first housing into said second fluid passage to provide a fluid-tight seal; and a second closure member insertable from said exterior area of said first housing into said third fluid passage to provide a fluid-tight seal.

2. The rack and pinion steering assembly of claim 1 wherein said piston has an axial length, said first and second fluid passages being axially spaced apart by a distance greater than said axial length of said piston.

3. The rack and pinion steering assembly of claim 1 wherein said third fluid passage extends approximately in the plane of said interior area of said first housing.

4. The rack and pinion steering assembly of claim 1 wherein at least one of said second and third fluid passages tapers as said at least one fluid passage extends from said exterior area of said first housing toward said interior area of said first housing.

5. The rack and pinion steering assembly of claim 1 further comprising:

a fifth fluid passage in said second housing extending from said exterior area of said second housing into said second chamber portion, said fifth fluid passage being spaced axially from said fourth fluid passage toward said first axial end of said cylinder;

a sixth fluid passage in said second housing extending from said exterior area of said second housing and intersecting said fourth and fifth fluid passages in said second housing to provide fluid communication between said fourth and fifth fluid passages;

a third closure member insertable from said exterior area of said second housing into said fifth fluid passage to provide a fluid-tight seal; and a fourth closure member insertable from said exterior area of said second housing into said sixth fluid passage to provide a fluid-tight seal.

* * * * *